Nov. 18, 1947.          L. M. WALDORF          2,431,217
FILM HOLDER
Filed Oct. 25, 1945                    3 Sheets-Sheet 3
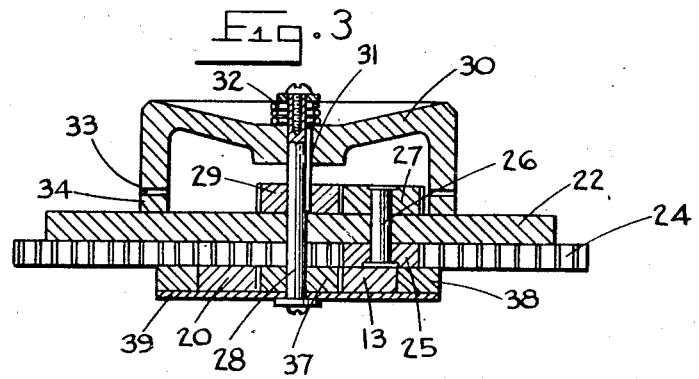
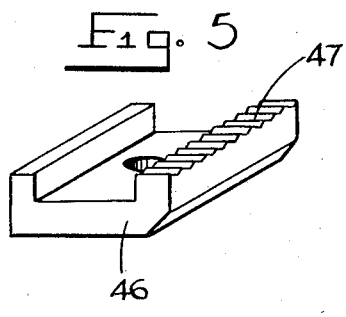
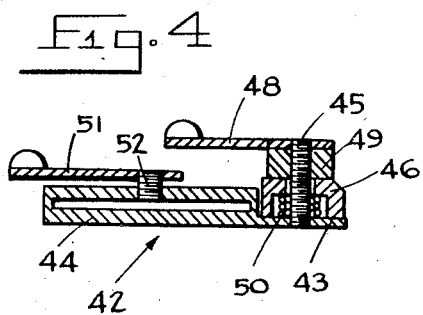
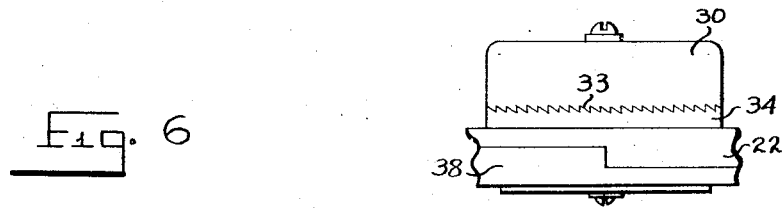
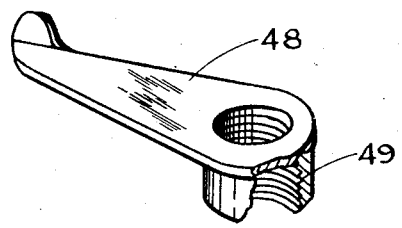
INVENTOR.
LEON MAURICE WALDORF
BY
ATTORNEYS Patented Nov. 18, 1947

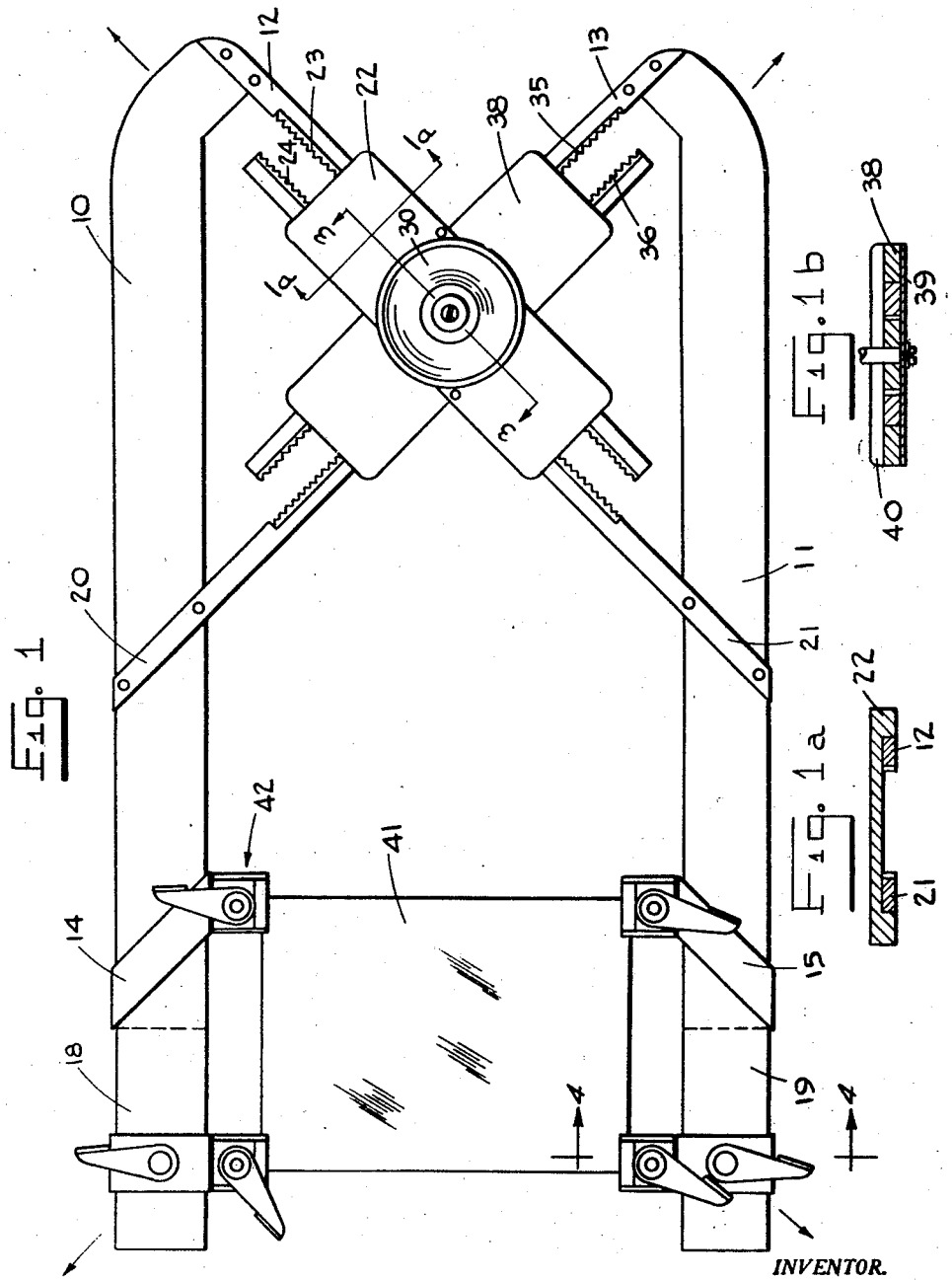

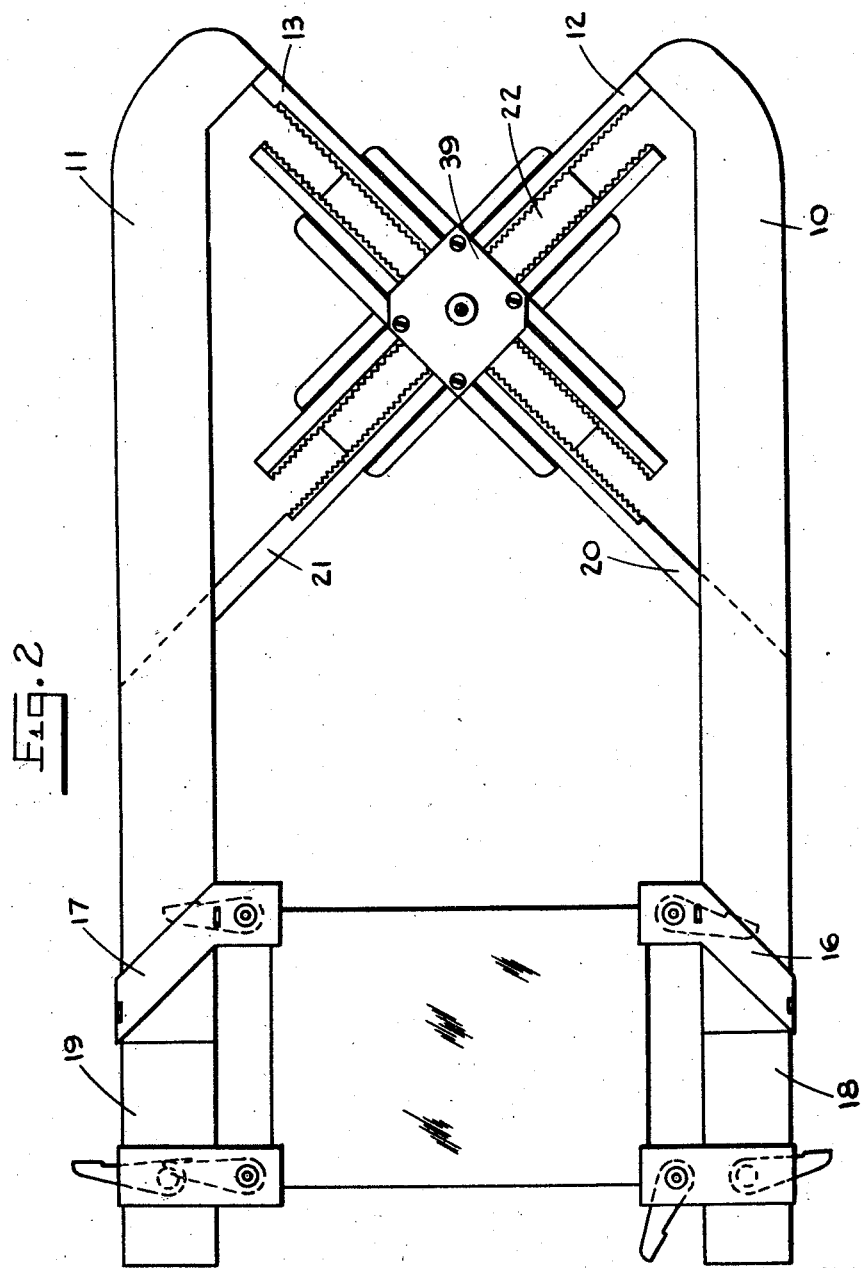

2,431,217

UNITED STATES PATENT OFFICE 2,431,217

FILM HOLDER

Leon Maurice Waldorf, Binghamton, N. Y., assignor to General Aniline & Film Corporation, New York, N. Y., a corporation of Delaware Application October 25, 1945, Serial No. 624,429

4 Claims. (Cl. 88—24)

This application pertains to a film holder such as may be used for holding negatives or other transparencies for projection or for enlarging. The invention is especially concerned with an adjustable holder adapted to accommodate many sizes of film sheets or cut film and adapted to tension or tighten the film so that it will be held in a single plane and in flattened condition without the aid of the usual glass plates to be found in more conventional film holders.

Among the objects of the invention is that of devising a film holder in which film sheets of standard or other sizes may be readily clamped and by a simple movement of a tightening or tensioning instrumentality, extended into flat and slightly tensioned condition. That is accomplished by tension applied at each of the four corners and effective in a more or less diagonal direction.

Another object is to devise a film holder of the type described in which adjustments may be made to accommodate cut film sheets of a wide number of sizes.

Other objects will be apparent from the following description.

The film holder hereinafter to be described in detail includes among other elements, clamps between which each of the four corners of a sheet of film may be readily inserted and positively held. These clamps are designed to be quickly released when the film sheet has been projected and is to be removed. The clamps are retained upon a system of sliding blades, each of which is movable in a particular direction by one of a number of angularly disposed arms on which are cut or otherwise provided rack teeth. At a central point of intersection for these rack toothed arms, an adjusting and tensioning mechanism is provided. It includes a single knob or other instrumentality by which a system of small gears are rotated, said gears being in mesh with the rack teeth on the above-mentioned arms and so designed as to move those arms in a direction for sliding the blades one upon the other, and simultaneously moving opposite pairs of blades laterally to or from each other.

According to the preferred form of the invention, one pair of blades, that is, one blade at either side of the holder has its film clamp fixed thereto while the other blade has provision whereby the film clamp held thereby may be adjusted along the length of the blade thereby to provide for retention of film sheets of different sizes. Of course, as these adjustable clamps are moved to accommodate film of a particular size, the adjustment afforded thereby is limited to one direction or one dimension for the film. Adjustment in the opposite direction is provided by the above-mentioned rack and pinion device which also serves to tighten or tension the film sheet once it has been clamped.

In the following paragraphs a description of one specific form of the invention will be given, like parts being indicated by like numerals in the accompanying figures of drawing, in which:

Fig. 1 is a plan view of the film holder, a sheet of cut film being clamped and tensioned therein.

Fig. 1a is a section at line 1a—1a, Fig. 1.

Fig. 1b is a partial section at line 3—3, Fig. 1.

Fig. 2 is a view similar to Fig. 1, but showing the lower side of the device.

Fig. 3 is a section taken at line 3—3, Fig. 1.

Fig. 4 is a section taken at line 4—4, Fig. 1.

Fig. 5 is a detail of one part of the film clamping members.

Fig. 6 is a detail view of one of the actuating members or levers by which the film clamps are tightened and by which the movable clamp holders are released or locked to their respective blades.

Fig. 7 is a detailed view of the operating knob and its locking teeth.

Referring to Figs. 1 and 2, the film holder includes among other parts, blades 10 and 11 which extend from arms 12 and 13 riveted or otherwise attached to them, to the straps 14 and 15 which form with the fixed clamp extensions 16 and 17, a rectangular guideway through which may slide the second set of blades 18 and 19 similar to the blades 10 and 11, and to which are fixed by rivets or other suitable connecting means two arms 20 and 21, the latter being disposed at right angles to the first mentioned arms 12 and 13, respectively. These blades 18 and 19 terminate at a point somewhat beyond the ends of the blades 10 and 11 as illustrated in these figures.

As shown in Figs. 1, 2, and 3, the arms 12 and 21 are guided within an elongated rectangular member 22 which is of cross-section as illustrated in Fig. 1a. These arms 12 and 21 have rack teeth 23 and 24 either cut in the arms themselves or more preferably being constituted as separate rack members attached to said arms. These rack members which may be termed the top members, since they function at a higher level, are actuated by a pinion 25, Fig. 3, the means for movement of which will presently be described. That pinion is shown meshing with the rack 24 on arm 21 and, of course, at the other side, the pinion meshes with rack 23 on rack 12. Pinion 25 is fixed at one end of a short shaft or spindle 26, at the other end of which is fixed a second and similar pinion 27. At the center of the block or plate 22 a somewhat longer spindle 28 is provided for rotation in a bearing in the plate and also carried at about its central part and at a level to mesh with pinion 27, a pinion 29 keyed to turn with the spindle whenever the same is revolved by means of a knob or thumb wheel 30. This knob 30 is slidable along the spindle 28 and the key 31, and tends to be retained in a lowermost position by means of the spring 32. At its rim, the knob has a plurality of teeth 33 which engage with similar teeth on a ring 34 fixed to the plate 22. These teeth incline in such a direction that as the blades are moved apart as for tensioning a sheet of film, they lock the device against return movement. In the other direction, they offer little resistance and merely slip over one another.

From the description up to this point, it is evident that turning the knob 30 in one direction will, by means of the pinions 29, 27, and 25, move the arms 12 and 21 in opposite directions. The arm 12, when thus moved, moves the blade 10 in the direction of the arrow at the right-hand upper corner of Fig. 1. At the same time, a similar movement in the opposite direction, as evidenced by the arrow at the end of blade 19, is imparted to that blade.

The blades 11 and 18 are moved by their respective arms 13 and 20 which have racks 35 and 36, the teeth of which are in mesh with a fourth pinion 37, similar to the others, but fixed at the lowermost end of spindle 28. As the knob 30 is turned to impart movement as above described to the plates 10 and 11, this pinion 37 rotates in such direction as to move arms 13 and 20 in opposite directions and away from the center of the actuating device so as to extend or move the blade 11 as shown by the arrow at the lower right-hand corner of Fig. 1, and blade 18 in a direction indicated by the arrow adjacent that blade end.

A second block or plate 38, somewhat similar to plate 22, guides the arms 13 and 20. A rectangular cap or cover 39 is fixed beneath the lower part of the plate 38 and serves to confine the arms within the slot lengthwise of this plate. Plate 38 is also undercut or slotted at this upper side at 40, Fig. 1b, so that plate 22 may set into it, to permit the passage of arms 12 and 21 and to provide space for the pinion 25.

A sheet of film 41 is clamped at each of its four corners by an equal number of clamps generally designated by numeral 42. Two of these clamps are fixed to their respective blades, that is, to the blades 10 and 11. The other two clamping members are slidable along the blades 18 and 19, thus providing an adjustment for setting the device to take film of different sizes.

Now referring to Figs. 4, 5, and 6, one of the clamps is illustrated, the particular one illustrated being an adjustable clamp. There is a relatively fixed member or jaw 43 extending from the rectangular part 44 which engages about the blades 18 or 19, as the case may be. A stud 45 is set in the fixed clamping member 43 and has freely movable thereon the other jaw of the film clamp indicated by numeral 46 and more clearly shown inverted in Fig. 5. This jaw 46 may have serrations 47 for engaging the film or it may merely present a smooth surface in which event the film will be clamped only by frictional engagement and pressure without any reliance upon indenting the material for increasing the holding power. An arm or short lever 48 is an integral part of a nut 49 engageable with the upper end of stud 45. For quick action, these elements are provided with a double or a triple thread, although that is not entirely necessary. It does, however, serve for placing the levers 48 in such position that when the clamps are tightened, they will never extend over the top of the film. A spring 50 maintains the movable jaw 46 in raised position except when it is tightened down by the nut and lever.

A second lever 51 has fixedly set therein a short threaded stud 52 which may be turned in such a manner as to engage the flat side of the blade along which the clamp is slidable thereby to lock it in position after it has been slidably adjusted.

Each of the clamps at the outer ends, that is, on blades 18 and 19, is of the type illustrated in Fig. 4. The other two are not adjustable, but are fixed to the long blades 10 and 11 by rivets or by any other satisfactory connecting means. As before described, the straps 14, in conjunction with the clamp extensions 16 and 17, form rectangular openings through which the blades 18 and 19 pass and by which they are guided in their movements.

In operation, the knob 30 is turned in the appropriate direction so that the opposed pairs of blades are moved to or from each other until the clamps are at about the proper distance apart for taking the particular size sheet to be projected. Then the movable clamps are adjusted along their blades to accommodate the other dimension of the film. The movable clamps are then fixed in position by tightening the locking levers 51 after which knob 30 is rotated clockwise thereby sliding each of the pairs of blades 10 and 18 and 11 and 19 longitudinally of one another and laterally moving each pair outwardly until sufficient tension has been imposed upon the film sheet. The teeth 33 lock the adjustment of parts until the knob is raised releasing these teeth as must be done when tension is to be released. At that time, the reverse movement of parts takes place and the film may be replaced by another of similar size, or suitable adjustment may be made and a sheet of film of another size clamped prior to being projected.

The specific embodiment of the invention herein described shows the principles upon which the invention is based and modifications will be apparent to those skilled in the art. If desired, other specific clamping means may be employed, also certain other details modified so long as the general scheme is followed. In the description and claims, reference is made to pairs of blades slidable longitudinally, for example, the blades 10 and 18 slidable in opposite directions and along their length, or the blades 11 and 19 which are similarly movable. The opposite pairs of blades are laterally movable to and from each other at the same time. Of course, these are blades 10 and 18 forming one pair and blades 11 and 19 forming another pair, and as the knob is turned, they move toward each other or away from each other depending upon the direction of rotation for that knob.

In certain instances, it may be desirable to set the plates 22 and 38 at other than a right angle and to incline the arms 12, 20, etc. at a corresponding angle and at something other than the 45° angle which they now make with their respective blades to which they are attached. Instead of the knob 30, an actuating member of some other shape may be employed. Friction means for holding the knob and the remainder of the adjusting means in that position at which they are set may supplant the teeth 33.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. A film holder having in combination, parallel pairs of blades, a film clamping member attached to and movable with each blade, and means for sliding blades of each pair longitudinally in opposite directions, and for simultaneously moving opposite pairs of blades laterally to and from each other, said means including arms, one for each blade, angularly disposed toward the said blade so that arms from each pair of blades are directed to cross each other at an angle, and so that the arms from oppositely movable blades in opposed pairs are disposed in spaced, parallel relation, rack teeth on said arms, and pinions, one of which is engageable with rack teeth on one pair of spaced, parallel arms, and another of which is engageable with rack teeth on the other pair of spaced, parallel arms, and a means interconnected with said pinions for rotating them to move each pair of said spaced, parallel arms in opposite direction.

2. A film holder having in combination, parallel pairs of blades, a film clamping member attached to and movable with each blade, and means for sliding blades of each pair longitudinally in opposite directions, and for simultaneously moving opposite pairs of blades laterally to and from each other, said means including arms, one for each blade, angularly disposed toward the said blade so that arms from each pair of blades are directed to cross each other at an angle, and so that arms from oppositely movable blades in opposed pairs are disposed in spaced, parallel relation, guide means including angularly disposed plates having slots within which pairs of oppositely directed arms are guided for sliding movement, rack teeth on said arms, and pinions, one of which is engageable with rack teeth in one pair of spaced, parallel arms, and another of which is engageable with rack teeth on the other pair of spaced, parallel arms, and means interconnected with said pinions for rotating them to move each pair of said spaced, parallel arms in opposite direction.

3. A film holder having in combination, parallel pairs of blades, a film clamping member attached to and movable with each blade, and a means for sliding blades of each pair longitudinally in opposite direction, and for simultaneously moving opposite pairs of blades laterally to and from each other, said means including arms, one for each blade angularly disposed toward the said blade so that arms from each pair of blades are directed to cross each other at an angle, and so that arms from oppositely movable blades in opposed pairs are disposed in spaced, parallel relation, guide means for said arms including a pair of attached angularly disposed plates having slots within which said oppositely directed arms are guided for sliding movement, rack teeth on each arm, and a centrally disposed spindle passing through said plates and having a pinion fixed thereto for engagement with one pair of spaced, parallel arms, a second pinion fixed for rotation with said spindle, and an eccentrically disposed spindle driven through a gear intermeshing with said last mentioned pinion and having fixed to its opposite end a pinion engageable with rack teeth on the other of said pairs of spaced, parallel arms, and a knob attached to said centrally disposed spindle for rotating that spindle, and a means for locking said knob in a set position.

4. Mechanism as defined in claim 3 in which said operating knob has teeth cut therein engageable with cooperating teeth on a fixed part of said guide means, said teeth preventing rotation in one direction, and spring means for maintaining engagement between teeth on the knob and those on the fixed member, but permitting disengagement thereof for releasing tension on said film.

LEON MAURICE WALDORF.

REFERENCES CITED

The following references are of record in the file of this patent:

UNITED STATES PATENTS

| Number | Name | Date |
| --- | --- | --- |
| 2,397,010 | Jacobson | Mar. 19, 1946 |